United States Patent
Du et al.

(10) Patent No.: US 7,965,499 B2
(45) Date of Patent: Jun. 21, 2011

(54) COMPUTER CASE

(75) Inventors: Lian-Chang Du, Shanghai (CN); Shou-Jen Yang, Taipei (TW)

(73) Assignee: Inventec Corporation, Taipei (TW)

( * ) Notice: Subject to any disclaimer, the term of this patent is extended or adjusted under 35 U.S.C. 154(b) by 319 days.

(21) Appl. No.: 12/273,302

(22) Filed: Nov. 18, 2008

(65) Prior Publication Data

US 2010/0033918 A1 Feb. 11, 2010

(30) Foreign Application Priority Data

Aug. 8, 2008 (CN) .......................... 2008 1 0145468

(51) Int. Cl.
*H05K 7/20* (2006.01)

(52) U.S. Cl. ................... 361/679.32; 361/724; 361/725; 361/731; 312/223.1; 312/223.2; 312/265.5

(58) Field of Classification Search ............. 361/679.04, 361/728, 731; 220/529; 312/265.6
See application file for complete search history.

(56) References Cited

U.S. PATENT DOCUMENTS

| | | | | |
|---|---|---|---|---|
| 5,338,214 A | * | 8/1994 | Steffes et al. | 439/160 |
| 5,466,059 A | * | 11/1995 | Liu | 312/223.2 |
| 5,524,104 A | * | 6/1996 | Iwata et al. | 720/652 |
| 5,542,757 A | * | 8/1996 | Chang | 312/223.2 |
| 5,650,911 A | * | 7/1997 | Scholder et al. | 361/679.4 |
| D381,956 S | * | 8/1997 | Naufel | D13/146 |
| 5,754,396 A | * | 5/1998 | Felcman et al. | 361/679.6 |
| 5,825,401 A | * | 10/1998 | Wadley et al. | 347/247 |
| 6,389,499 B1 | * | 5/2002 | Frank et al. | 710/300 |
| 6,550,877 B1 | * | 4/2003 | Anderson et al. | 312/223.2 |
| 6,934,148 B2 | * | 8/2005 | Gorenz et al. | 361/679.46 |
| 6,937,461 B1 | * | 8/2005 | Donahue, IV | 361/622 |
| 7,453,707 B2 | * | 11/2008 | Beall et al. | 361/796 |
| 7,599,183 B2 | * | 10/2009 | Dittus et al. | 361/695 |
| 7,606,044 B2 | * | 10/2009 | Bailey et al. | 361/752 |
| 7,744,172 B2 | * | 6/2010 | Chen et al. | 312/223.2 |
| 7,768,787 B2 | * | 8/2010 | Vaughan et al. | 361/725 |
| 2005/0238358 A1 | * | 10/2005 | Light | 398/135 |
| 2008/0180920 A1 | * | 7/2008 | Chang | 361/728 |

* cited by examiner

*Primary Examiner* — Jayprakash N Gandhi
*Assistant Examiner* — Anthony Q Edwards
(74) *Attorney, Agent, or Firm* — J.C. Patents

(57) ABSTRACT

A computer case including a body, a first rear window, a blocking panel, and a plurality of exchangeable modules is provided. The body has a containing opening. The first rear window is assembled to the body and is located within the containing opening, and the first rear window has a module opening and a blocking panel opening. One of the exchangeable modules is assembled to the first rear window. The blocking panel is assembled to the first rear window and is located within the blocking panel opening, and the blocking panel has a plurality of connector openings.

17 Claims, 7 Drawing Sheets

COMPUTER CASE

CROSS-REFERENCE TO RELATED APPLICATION

This application claims the priority benefit of P.R.C. patent application serial no. 200810145468.4, filed on Aug. 8, 2008. The entirety of the above-mentioned patent application is hereby incorporated by reference herein and made a part of specification.

BACKGROUND OF THE INVENTION

1. Field of the Invention

The present invention generally relates to a case, and more particularly, to a computer case.

2. Description of Related Art

In the present age of information and multimedia, computers, such as servers, workstations, desktop computers, notebook computers, or even industrial computers, have become one of the most indispensable tools in our daily life.

A desktop computer includes a main body, a display, and peripheral devices. The main body further includes a computer case, and various electronic components (for example, a mother board, a central processing unit (CPU), an interface card, and a memory, etc) are disposed inside the computer case. Besides, various storage devices (for example, a hard disk, a floppy disk, and a CD-ROM drive, etc) are also disposed inside the computer case.

However, a computer case should have different structure designs corresponding to different numbers of interface cards and storage devices. For example, the number and positions of openings on a front panel or a rear window of a computer case have to be adjusted according to the numbers of interface cards and storage devices. In this case, the computer case has to be redesigned and remanufactured, which is very costly.

SUMMARY OF THE INVENTION

Accordingly, the present invention is directed to a computer case having a modular second rear window.

The present invention provides a computer case including a body, a first rear window, a blocking panel, and a plurality of exchangeable modules. The body has a containing opening. The first rear window is assembled to the body and is located within the containing opening. The first rear window has a module opening and a blocking panel opening. One of the exchangeable modules is assembled to the first rear window. The blocking panel is assembled to the first rear window and is located within the blocking panel opening. The blocking panel has a plurality of connector openings.

According to an embodiment of the present invention, the second rear window has at least one first interface card opening.

According to an embodiment of the present invention, one of the exchangeable modules has a second rear window and a riser card fastener, and the second rear window is located within a part of the module opening.

According to an embodiment of the present invention, the outline of the second rear window substantially matches the outline of the module opening.

According to an embodiment of the present invention, the second rear window has at least one interface card opening.

According to an embodiment of the present invention, the second rear window further has at least one storage device opening.

According to an embodiment of the present invention, the storage device opening is longer than the interface card opening.

According to an embodiment of the present invention, one of the exchangeable modules has a second rear window, a third rear window, and a riser card fastener, wherein the third rear window is assembled to the second rear window, and the second rear window and the third rear window are located within parts of the module opening.

According to an embodiment of the present invention, the outline of the second rear window and the third rear window after being assembled substantially matches the outline of the module opening.

According to an embodiment of the present invention, the second rear window has at least one first interface card opening.

According to an embodiment of the present invention, the third rear window has at least one second interface card opening.

According to an embodiment of the present invention, the first interface card opening is longer than the second interface card opening.

According to an embodiment of the present invention, one of the exchangeable modules has a second rear window and a storage device rack, wherein the second rear window is assembled to the storage device rack, and the second rear window is located within a part of the module opening.

According to an embodiment of the present invention, the module opening is divided into a rear window opening portion and a storage module opening portion, wherein the second rear window is located within the rear window opening portion, and the storage device rack is located within the storage module opening portion.

According to an embodiment of the present invention, the outline of the second rear window and the storage device rack after being assembled substantially matches the outline of the module opening.

According to an embodiment of the present invention, the computer case further includes a blocking panel frame assembled between the first rear window and the blocking panel, and the blocking panel frame is located within a part of the blocking panel opening.

According to an embodiment of the present invention, the body has a bottom panel, and the blocking panel frame is fastened to the bottom panel.

According to an embodiment of the present invention, the exchangeable modules respectively include one of an interface card module and a storage device module.

According to an embodiment of the present invention, the storage device module is a hard disk module.

In the computer case provided by the present invention, the exchangeable modules are assembled to a first rear window so that the exchangeable modules can be conveniently disassembled from the first rear window. Besides, in the computer case provided by the present invention, different exchangeable modules can be flexibly used according to the desired number of interface card openings or storage device openings. Thus, it is not needed to remanufacture the entire computer case when the requirement changes. As a result, the manufacturing cost of the computer case is reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
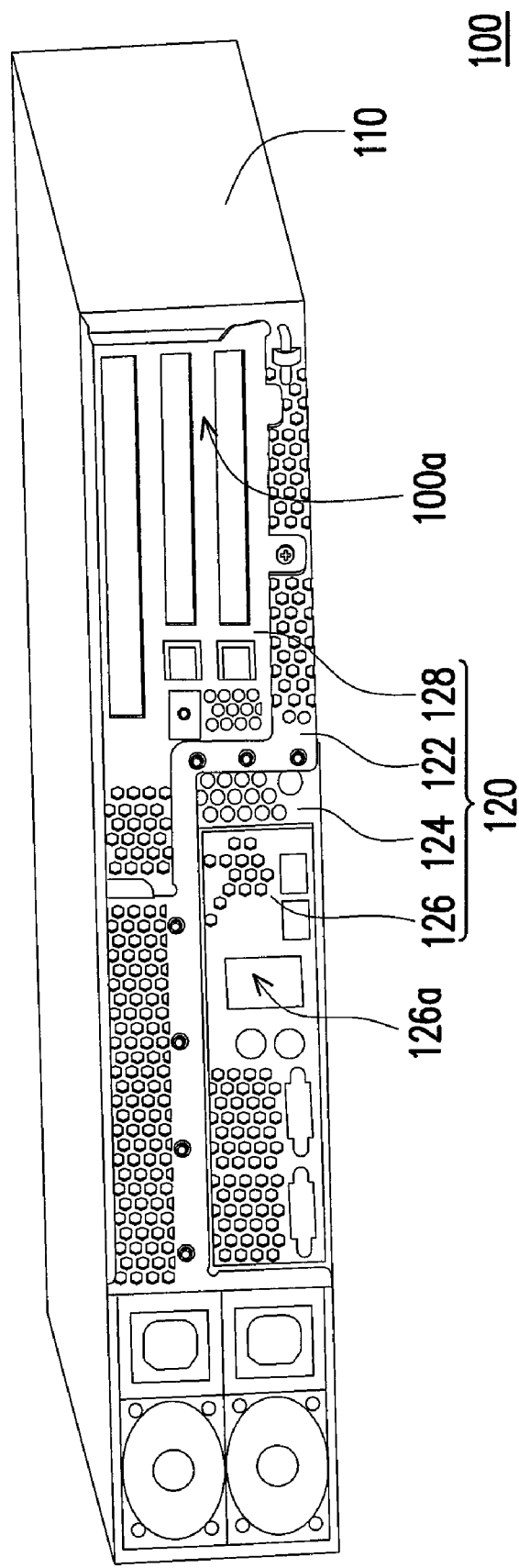
FIG. 1 is a perspective diagram of a computer case according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
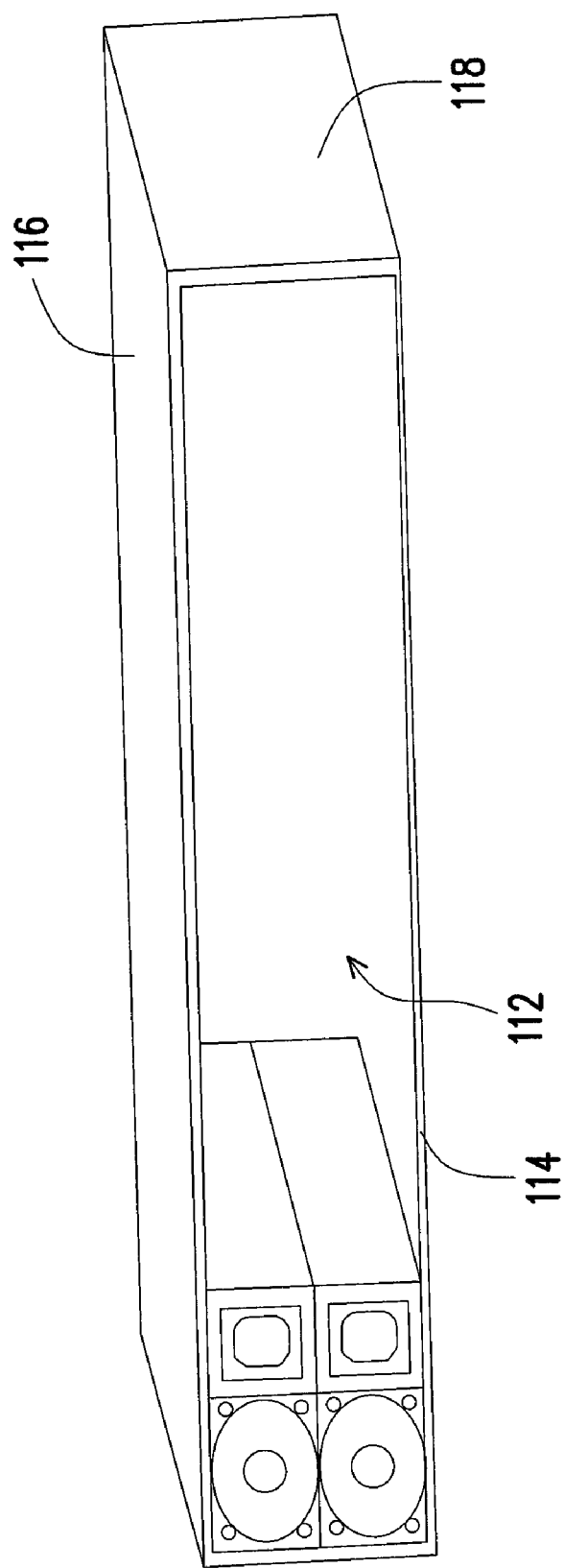
FIG. 2 is a perspective diagram of a body in FIG. 1.
Figure 5:
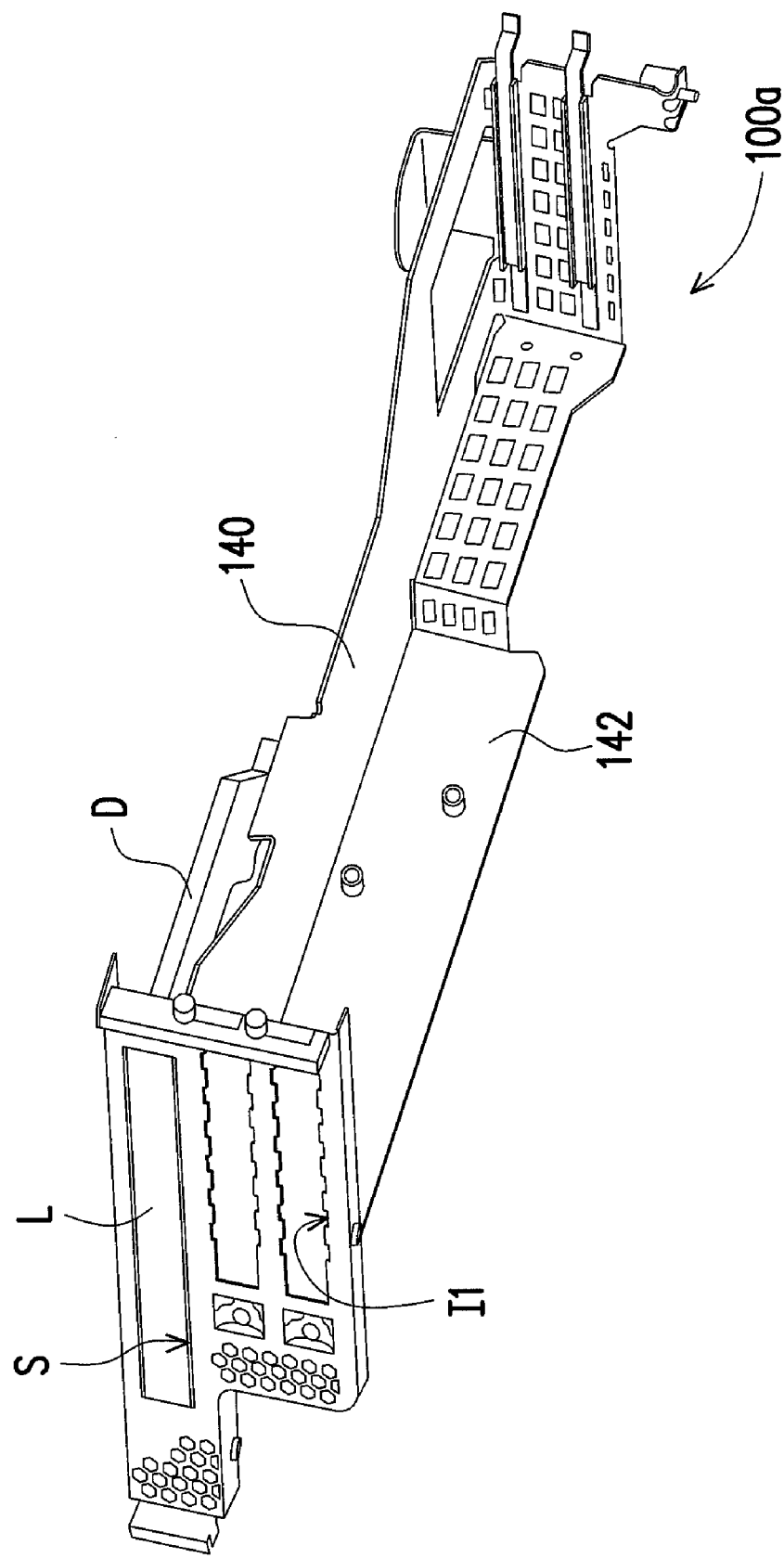
FIG. 5 is a perspective diagram of a second rear window assembled to a riser card fastener in FIG. 1.

FIG. 1 is a perspective diagram of a computer case according to an embodiment of the present invention, and FIG. 2 is a perspective diagram of a body in FIG. 1. Referring to FIG. 1 and FIG. 2, the computer case 100 includes a body 110, a first rear window 122, a blocking panel 126, and an exchangeable module 100a (as shown in FIG. 5). The exchangeable module 100a is assembled to the first rear window 122 and has a second rear window 128. In the present embodiment, the computer case 100 further includes a blocking panel frame 124, and the first rear window 122, the blocking panel frame 124, the blocking panel 126, and the second rear window 128 may form a complete rear window structure 120.

The body 110 has a containing opening 112. The first rear window 122 is assembled to the body 110 and is located within the containing opening 112. In the present embodiment, the body 110 further has a bottom panel 114, a top panel 116, and two side panels 118. The bottom panel 114 and the top panel 116 are respectively located at two opposite sides of the body 110, and the two side panels 118 are connected between the bottom panel 114 and the top panel 116. The bottom panel 114, the top panel 116, and the two side panels 118 define the containing opening 112. Besides, the first rear window 122 is fastened to the bottom panel 114 and the side panels 118 through fasteners (for example, screws, not shown).

Figure 3:
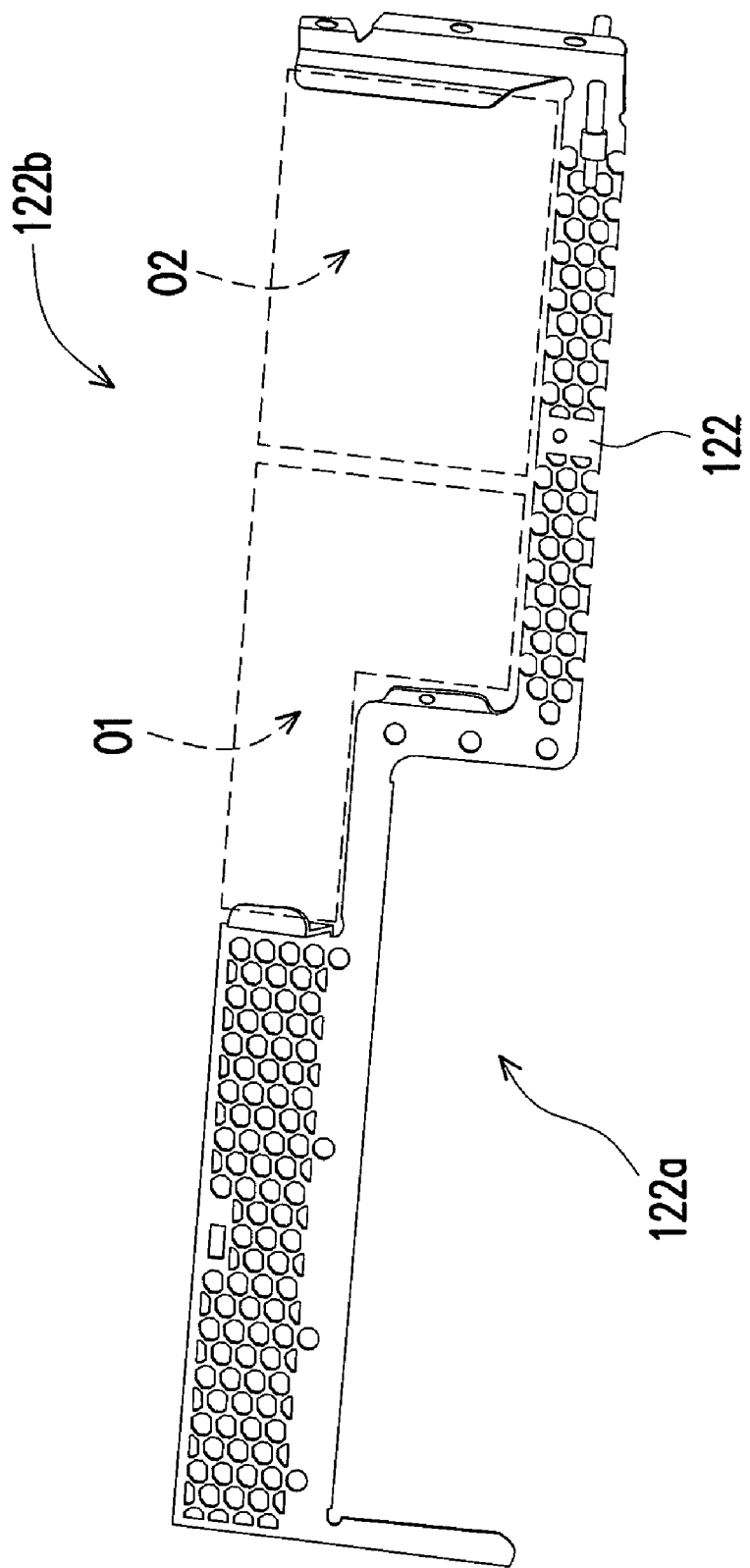
FIG. 3 is a perspective diagram of a first rear window in FIG. 1.
Figure 4:
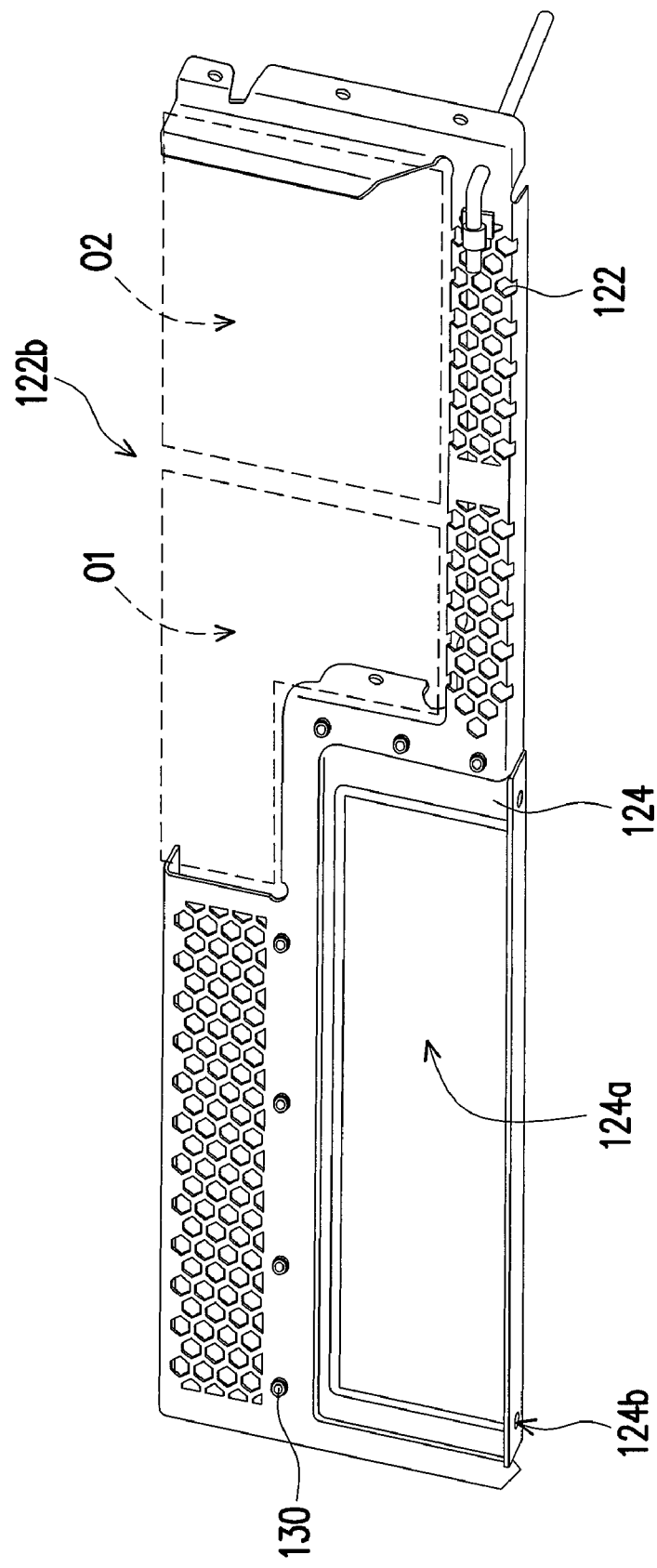
FIG. 4 is a perspective diagram of a blocking panel frame and the first rear window in FIG. 1.

FIG. 3 is a perspective diagram of the first rear window 122 in FIG. 1, and FIG. 4 is a perspective diagram of the blocking panel frame 124 and the first rear window 122 in FIG. 1. Referring to FIG. 1, 3, and 4, the first rear window 122 has a module opening 122b for accommodating the second rear window 128. In the present embodiment, the outline of the second rear window 128 may substantially match the outline of the module opening 122b. Besides, the first rear window 122 further has a blocking panel opening 122a for accommodating the blocking panel frame 124.

The blocking panel frame 124 is assembled to the first rear window 122 and has a frame opening 124a. The blocking panel frame 124 is located within a part of the blocking panel opening 122a, wherein the frame opening 124a is part of the blocking panel opening 122a. In the present embodiment, the blocking panel frame 124 is fastened to the first rear window 122 through a fastener 130 (for example, a rivet). However, in another embodiment of the present invention, the blocking panel frame 124 may be formed integrally with the first rear window 122. In addition, the blocking panel frame 124 further has a plurality of fixing holes 124b located at one side of the blocking panel frame 124 close to the bottom panel 114 such that the blocking panel frame 124 can be fastened to the bottom panel 114 by inserting fasteners (for example, screws, not shown) through these fixing holes 124b (as shown in FIG. 2). As a result, the sturdiness of the structure is improved.

The blocking panel 126 is assembled to the blocking panel frame 124 and has a plurality of connector openings 126a for exposing connectors (for example, a universal serial bus connector and a network connector, etc, not shown) on a mother board. Besides, blocking panel 126 is located within a part of the frame opening 124a. Namely, the blocking panel 126 is located within part of the blocking panel opening 122a. In the present embodiment, the blocking panel frame 124 is assembled between the first rear window 122 and the blocking panel 126, so as to assemble the blocking panel 126 to the first rear window 122 through the blocking panel frame 124.

FIG. 5 is a perspective diagram of the second rear window 128 assembled to a riser card fastener in FIG. 1. Referring to FIG. 5, the computer case 100 further includes a riser card fastener 140. The riser card fastener 140 has a fixing portion 142 for disposing and fastening a riser card (not shown). Besides, the second rear window 128 has at least one interface card opening I1 (two are illustrated in FIG. 5) for exposing connectors (not shown) on an interface card (not shown). In addition, the second rear window 128 further has at least one storage device opening S (one is illustrated in FIG. 5) for exposing at least one storage device, such as a CD-ROM D. In other words, a CD carrier L of the CD-ROM D can exit from the storage device opening S so that a user can place a CD (not shown) on the CD carrier L. In the present embodiment, the storage device opening S is longer than the interface card opening I1. In the present embodiment, the second rear window 128 and the riser card fastener 140 are respectively a part of an exchangeable module 100a, and the exchangeable module 100a may include an interface card module and a storage device module (the CD-ROM D).

Figure 6:
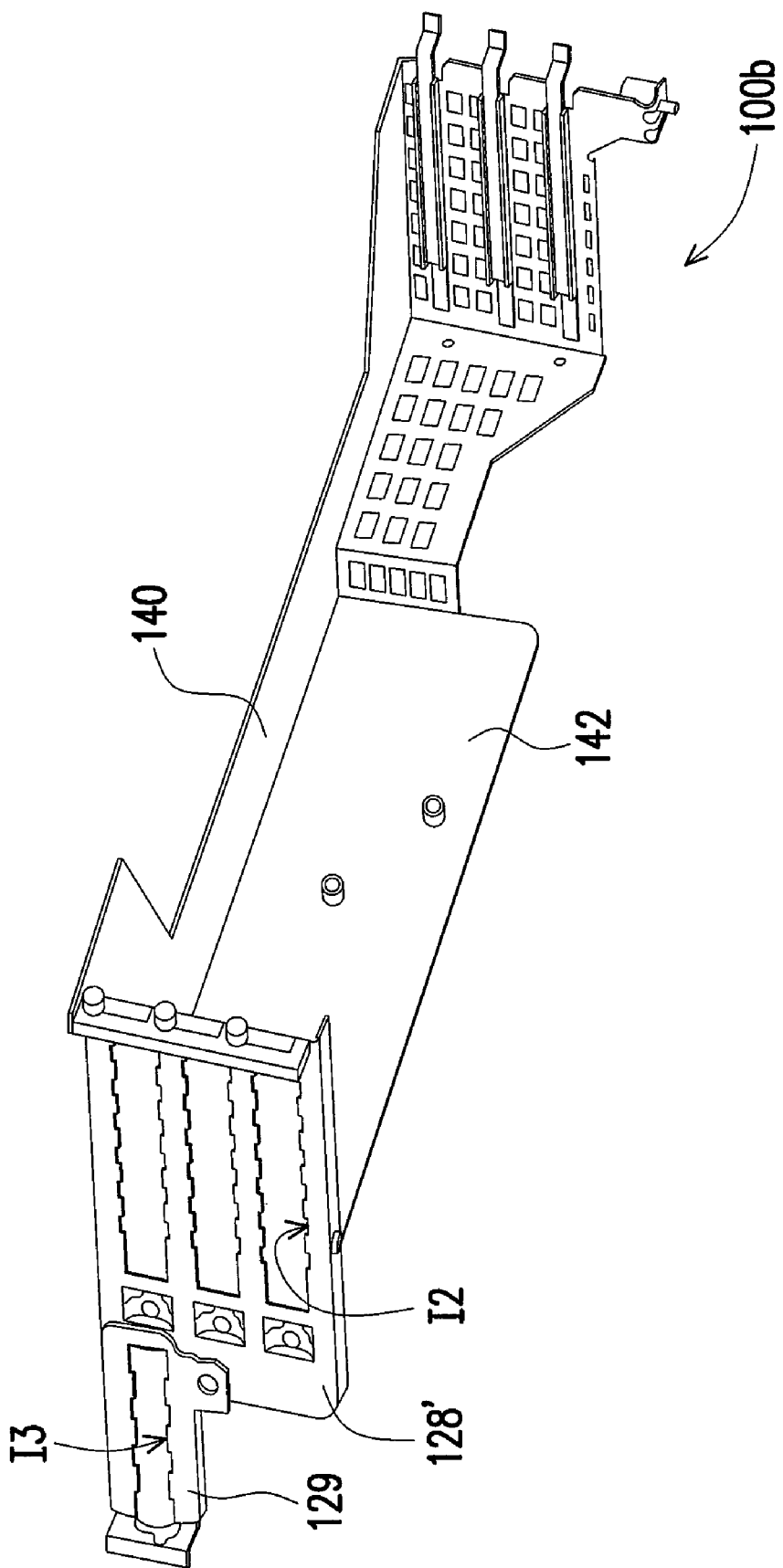
FIG. 6 is a perspective diagram of a second rear window assembled to a riser card fastener according to another embodiment of the present invention.

FIG. 6 is a perspective diagram of a second rear window assembled to a riser card fastener according to another embodiment of the present invention. Referring to FIG. 5 and FIG. 6, the difference between the present embodiment and the embodiment illustrated in FIG. 5 is that in the present embodiment, the second rear window 128 is replaced by a second rear window 128', and the computer case 100 further includes a third rear window 129 assembled to the first rear window 122 and the second rear window 128'. The third rear window 129 is located within a part of the module opening 122b. The second rear window 128' has at least one first interface card opening I2 (three are illustrated in FIG. 6), and the third rear window 129 has at least one second interface card opening I3 (one is illustrated in FIG. 6). The first interface card opening I2 is longer than the second interface card opening I3. In the present embodiment, the second rear window 128', the third rear window 129, and the riser card fastener 140 are respectively a part of an exchangeable module 100b. In addition, the outline of the second rear window 128' and the third rear window 129 after being assembled substantially matches the outline of the module opening 122b.

Figure 7:
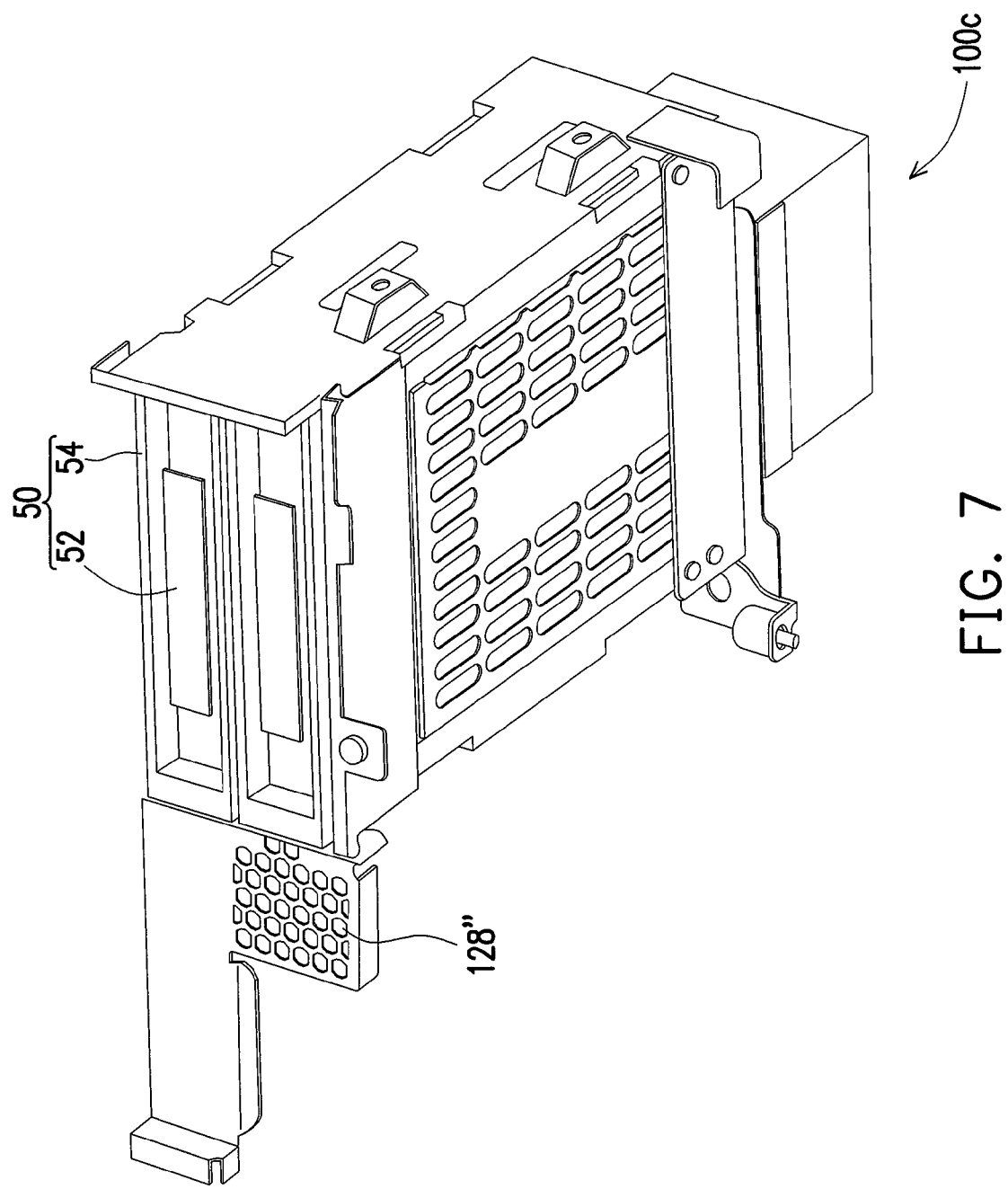
FIG. 7 is a perspective diagram of a second rear window assembled to a storage device module according to yet another embodiment of the present invention.

FIG. 7 is a perspective diagram of a second rear window assembled to a storage device module according to yet another embodiment of the present invention. Referring to FIG. 5 and FIG. 7, the difference between the present embodiment and the embodiment illustrated in FIG. 5 is that in the present embodiment, the second rear window 128 is replaced by a second rear window 128". In addition, referring to FIG. 3, the module opening 122*b* is divided into a rear window opening portion O1 and a storage module opening portion O2, and the second rear window 128" is located within the rear window opening portion O1. Besides, the second rear window 128" is assembled to a storage device module 50. The storage device module 50 may include two hard disks 52 and a storage device rack 54. The storage device rack 54 is located within the storage module opening portion O2, and the two hard disks 52 are disposed in the storage device rack 54. A user can replace the hard disks 52 through the storage module opening portion O2. However, an interface card opening (not shown) may also be disposed in the second rear window 128" according to the actual requirement. In the present embodiment, the second rear window 128" and the storage device rack 54 are respectively a part of an exchangeable module 100*b*.

As described above, in a computer case provided by the present invention, the exchangeable modules are assembled to a first rear window so that the exchangeable modules can be disassembled from the first rear window conveniently. Moreover, in a computer case provided by the present invention, different exchangeable modules can be flexibly used according to the desired number of interface cards or storage devices to be disposed. Thereby, when the requirement changes, it is not needed to remanufacture the entire computer case. As a result, the manufacturing cost of the computer case is reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer case, comprising:
   a body, having a containing opening;
   a first rear window, assembled to the body and located within the containing opening, the first rear window having a module opening and a blocking panel opening;
   a plurality of exchangeable modules, wherein one of the exchangeable modules is assembled to the first rear window; and
   a blocking panel, assembled to the first rear window and located within the blocking panel opening, the blocking panel having a plurality of connector openings, wherein one of the exchangeable modules has a second rear window, a third rear window, and a riser card fastener, the third rear window is assembled to the second rear window, and the second rear window and the third rear window are located within parts of the module opening.

2. The computer case according to claim 1, wherein one of the exchangeable modules has a second rear window and a riser card fastener, and the second rear window is located within a part of the module opening.

3. The computer case according to claim 2, wherein an outline of the second rear window substantially matches an outline of the module opening.

4. The computer case according to claim 2, wherein the second rear window has at least one interface card opening.

5. The computer case according to claim 4, wherein the second rear window further has at least one storage device opening.

6. The computer case according to claim 5, wherein the storage device opening is longer than the interface card opening.

7. The computer case according to claim 1, wherein an outline of the second rear window and the third rear window after being assembled substantially matches an outline of the module opening.

8. The computer case according to claim 1, wherein the second rear window has at least one first interface card opening.

9. The computer case according to claim 8, wherein the third rear window has at least one second interface card opening.

10. The computer case according to claim 9, wherein the first interface card opening is longer than the second interface card opening.

11. The computer case according to claim 1, wherein one of the exchangeable modules has a second rear window and a storage device rack, the second rear window is assembled to the storage device rack, and the second rear window is located within a part of the module opening.

12. The computer case according to claim 11, wherein the module opening is divided into a rear window opening portion and a storage module opening portion, the second rear window is located within the rear window opening portion, and the storage device rack is located within the storage module opening portion.

13. The computer case according to claim 11, wherein an outline of the second rear window and the storage device rack after being assembled substantially matches an outline of the module opening.

14. The computer case according to claim 1, further comprising:
   a blocking panel frame, assembled between the first rear window and the blocking panel, wherein the blocking panel frame is located within a part of the blocking panel opening.

15. The computer case according to claim 14, wherein the body has a bottom panel, and the blocking panel frame is fastened to the bottom panel.

16. The computer case according to claim 1, wherein the exchangeable modules respectively comprise one of an interface card module and a storage device module.

17. The computer case according to claim 16, wherein the storage device module is a hard disk module.

* * * * *